United States Patent
Micallef et al.

(10) Patent No.: US 11,536,064 B2
(45) Date of Patent: Dec. 27, 2022

(54) SELF-ENGAGING FAN COWL HOOK LATCH

(71) Applicant: ROHR, INC., Chula Vista, CA (US)

(72) Inventors: Steven Micallef, Chula Vista, CA (US); Rosa Gonzalez, San Diego, CA (US); Hugo Almaraz, San Juan Capistrano, CA (US)

(73) Assignee: Rohr, Inc, Chula Vista, CA (US)

( * ) Notice: Subject to any disclaimer, the term of this patent is extended or adjusted under 35 U.S.C. 154(b) by 803 days.

(21) Appl. No.: 16/361,962

(22) Filed: Mar. 22, 2019

(65) Prior Publication Data

US 2020/0300011 A1 Sep. 24, 2020

(51) Int. Cl.
*E05C 19/14* (2006.01)
*B64D 29/06* (2006.01)
*E05B 41/00* (2006.01)

(52) U.S. Cl.
CPC ............ *E05C 19/145* (2013.01); *B64D 29/06* (2013.01); *E05B 41/00* (2013.01)

(58) Field of Classification Search
CPC ....... E05C 19/145; E05C 19/14; B64D 29/06; E05B 41/00; E05B 15/0086; E05B 65/0817; Y10S 292/49
USPC .......................................... 292/256, 256.69
See application file for complete search history.

(56) References Cited

U.S. PATENT DOCUMENTS

| | | | |
|---|---|---|---|
| 4,538,843 A | 9/1985 | Harris | |
| 4,682,800 A | 7/1987 | Lovelace, Jr. | |
| 5,518,282 A | 5/1996 | Sawada | |
| 5,603,535 A | 2/1997 | Antonucci et al. | |
| 9,004,548 B2 | 4/2015 | Joret et al. | |
| 10,137,996 B2 | 11/2018 | Mellor | |
| 10,173,782 B2 | 1/2019 | Hernandez | |
| 2003/0151261 A1* | 8/2003 | Porte | E05B 63/143 292/229 |
| 2018/0362173 A1 | 12/2018 | Delaney et al. | |
| 2020/0156760 A1* | 5/2020 | Tillotson | B64C 3/58 |

OTHER PUBLICATIONS

European Patent Office, European Search Report dated Jun. 3, 2020 in Application No. 19216303.8.

* cited by examiner

*Primary Examiner* — Christine M Mills
*Assistant Examiner* — Yahya Sidky
(74) *Attorney, Agent, or Firm* — Snell & Wilmer L.L.P.

(57) ABSTRACT

A latch mechanism configured to engage a mating pin is disclosed. In various embodiments, the latch mechanism includes a latch frame; a latch arm pivotally mounted to the latch frame at a pivot axis; and a bias member configured to apply a load to the latch arm in a transverse direction generally perpendicular to the pivot axis and to bias the latch arm from rotating in a first rotational direction about the pivot axis and from rotating away from the mating pin.

11 Claims, 8 Drawing Sheets

SELF-ENGAGING FAN COWL HOOK LATCH

FIELD

The present disclosure relates generally to nacelle systems and, more particularly, to latch mechanisms used to secure and lock fan cowls of nacelle systems used on aircraft to house gas turbine engines.

BACKGROUND

Modern aircraft may utilize one or more gas turbine engines for propulsion. The engines may be housed in a nacelle, which may be wing-mounted, fuselage-mounted or tail-mounted or some combination thereof. A nacelle typically comprises an inlet section, a thrust reverser section and a fan cowl section. The fan cowl section may include two fan cowls, e.g., an upper fan cowl and a lower fan cowl for a fuselage-mounted nacelle. Typically, the upper fan cowl and the lower fan cowl are connected by a hinge system to a pylon or to a structure that is itself connected to the pylon. A latch mechanism may be employed to lock the upper fan cowl to the lower fan cowl when closed about the gas turbine engine to form the nacelle.

In various aircraft, such as, for example, business jets, the nacelles tend to be relatively long and of small diameter when sized against comparable engines hung from the underside of a wing. The length of the upper fan cowl and the lower fan cowl associated with such engines can result in difficulty when attempting to open and close the nacelle to access the various components housed within the nacelle. Various latch mechanisms, as described herein, may be used to alleviate such difficulty and provide for single-person operation when opening and closing the nacelle and when latching one of the lower fan cowl and upper fan cowl to the other.

SUMMARY

A latch mechanism configured to engage a mating pin is disclosed. In various embodiments, the latch mechanism includes a latch frame; a latch arm pivotally mounted to the latch frame at a pivot axis; and a bias member configured to apply a load to the latch arm in a transverse direction generally perpendicular to the pivot axis and to bias the latch arm from rotating in a first rotational direction about the pivot axis and from rotating away from the mating pin.

In various embodiments, a first latch arm stop is connected to the latch frame and configured to stop the latch arm from rotating in the first rotational direction following a first rotational movement in the first rotational direction. In various embodiments, the first latch arm stop is disposed at a first longitudinal position with respect to the pivot axis.

In various embodiments, a second latch arm stop is connected to the latch frame and configured to stop the latch arm from rotating in a second rotational direction following a second rotational movement in the second rotational direction. In various embodiments, the second latch arm stop is disposed at a second longitudinal position with respect to the pivot axis.

In various embodiments, the latch frame defines a longitudinal direction generally perpendicular to the pivot axis and the first latch stop and the second latch stop are disposed on opposite sides of the pivot axis along the longitudinal direction. In various embodiments, the bias member is configured to provide the load at a proximal end of the latch arm. In various embodiments, the pivot axis is located intermediate the proximal end and a distal end of the latch arm.

In various embodiments, the latch frame includes a first frame wall and a second frame wall connected to a back plate. In various embodiments, the latch arm is pivotally mounted to the first frame wall and to the second frame wall via a first spindle. In various embodiments, the bias member includes a spring plate configured to provide the load to a proximal end of the latch arm.

In various embodiments, a first latch arm stop is connected to the latch frame and configured to stop the latch arm from rotating in the first rotational direction following a first rotational movement in the first rotational direction and a second latch arm stop is connected to the latch frame and configured to stop the latch arm from rotating in a second rotational direction following a second rotational movement in the second rotational direction.

In various embodiments, a latch handle is coupled to the proximal end of the latch arm via a second spindle. In various embodiments, a latch arm hook is disposed at a distal end of the latch arm and configured to engage the mating pin.

A fan cowl assembly is disclosed. In various embodiments, the fan cowl assembly includes a first fan cowl connected to an inboard fan cowl section via a first hinge assembly; a second fan cowl connected to the inboard fan cowl section; and a latch mechanism configured to lock the first fan cowl to the second fan cowl, the latch mechanism comprising a latch frame, a latch arm pivotally mounted to the latch frame at a pivot axis, and a bias member configured to apply a load to the latch arm in a transverse direction generally perpendicular to the pivot axis and to bias the latch arm from rotating in a first rotational direction about the pivot axis.

In various embodiments, a first latch arm stop is connected to the latch frame and configured to stop the latch arm from rotating in the first rotational direction following a first rotational movement in the first rotational direction, the first latch arm stop disposed at a first longitudinal position with respect to the pivot axis. In various embodiments, a second latch arm stop is connected to the latch frame and configured to stop the latch arm from rotating in a second rotational direction following a second rotational movement in the second rotational direction, the second latch arm stop disposed at a second longitudinal position with respect to the pivot axis. In various embodiments, the latch frame defines a longitudinal direction generally perpendicular to the pivot axis, the first latch stop and the second latch stop are disposed on opposite sides of the pivot axis along the longitudinal direction and the bias member includes a spring plate configured to provide the load to a proximal end of the latch arm.

A method of locking a fan cowl assembly is disclosed. In various embodiments, the method includes the steps of positioning a first fan cowl in a closed position, the first fan cowl including a mating pin defining an axial direction; rotating a second fan cowl toward the first fan cowl, the second fan cowl including a latch mechanism configured to bias a latch arm hook in a transverse direction, generally perpendicular to the axial direction, toward the mating pin, the latch arm hook connected to a distal end of a latch arm; urging an outer surface of the latch arm hook against the mating pin, thereby causing the outer surface of the latch arm hook to slide about the mating pin; and biasing the latch arm hook via a bias member operably coupled to the latch arm, such that an inner surface of the latch arm hook engages the mating pin.

In various embodiments, the latch mechanism includes a latch frame, the latch arm pivotally mounted to the latch frame at a pivot axis, the bias member configured to apply a load to a proximal end of the latch arm, a first latch arm stop connected to the latch frame and configured to stop the latch arm from rotating in a first rotational direction following a first rotational movement in the first rotational direction and a second latch arm stop connected to the latch frame and configured to stop the latch arm from rotating in a second rotational direction following a second rotational movement in the second rotational direction.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

DETAILED DESCRIPTION

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

Figure 1A:
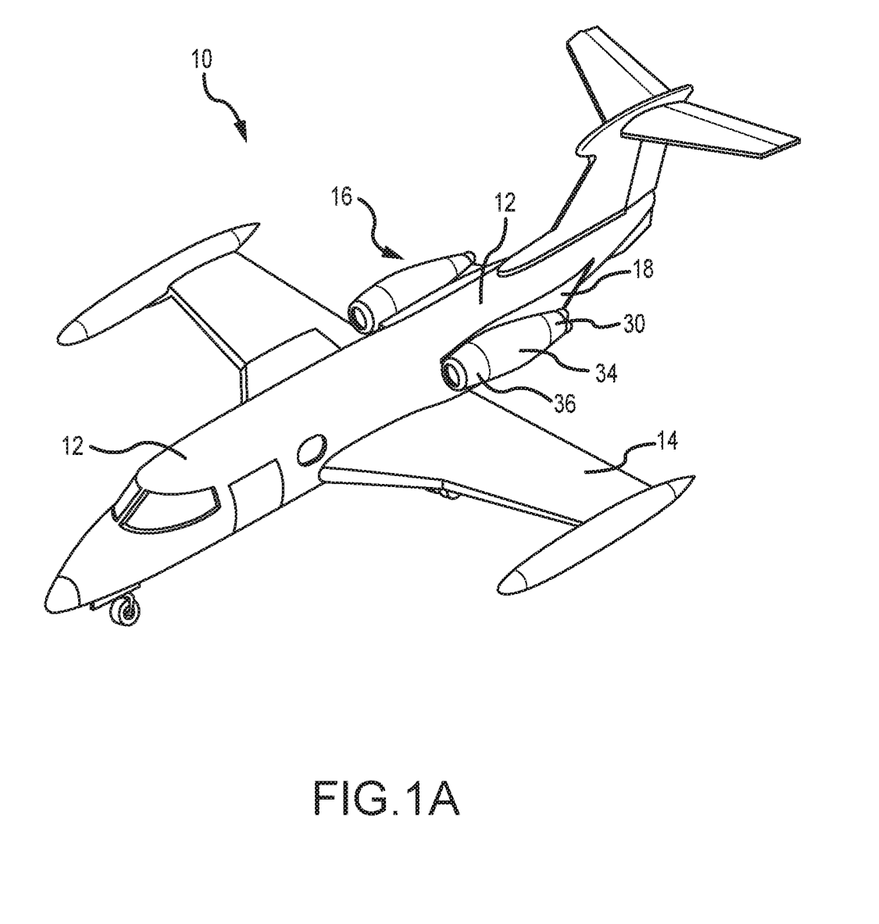
FIG. 1A illustrates an aircraft having fuselage mounted gas turbine engines, in accordance with various embodiments.

Referring now to the drawings, FIG. 1A schematically illustrates an aircraft 10, in accordance with various embodiments. The aircraft 10 generally includes a fuselage 12 extending the length of the aircraft 10. A wing 14 is attached to and extends from respective sides of the fuselage 12. A gas turbine engine 16 likewise is attached to and extends from respective sides of the fuselage 12. In various embodiments, the gas turbine engine 16 is attached to the fuselage 12 via a pylon 18. Further, in various embodiments, the gas turbine engine 16 includes a fan cowl assembly 34, an inlet section 36 and a thrust reverser 30.

Figure 1B:
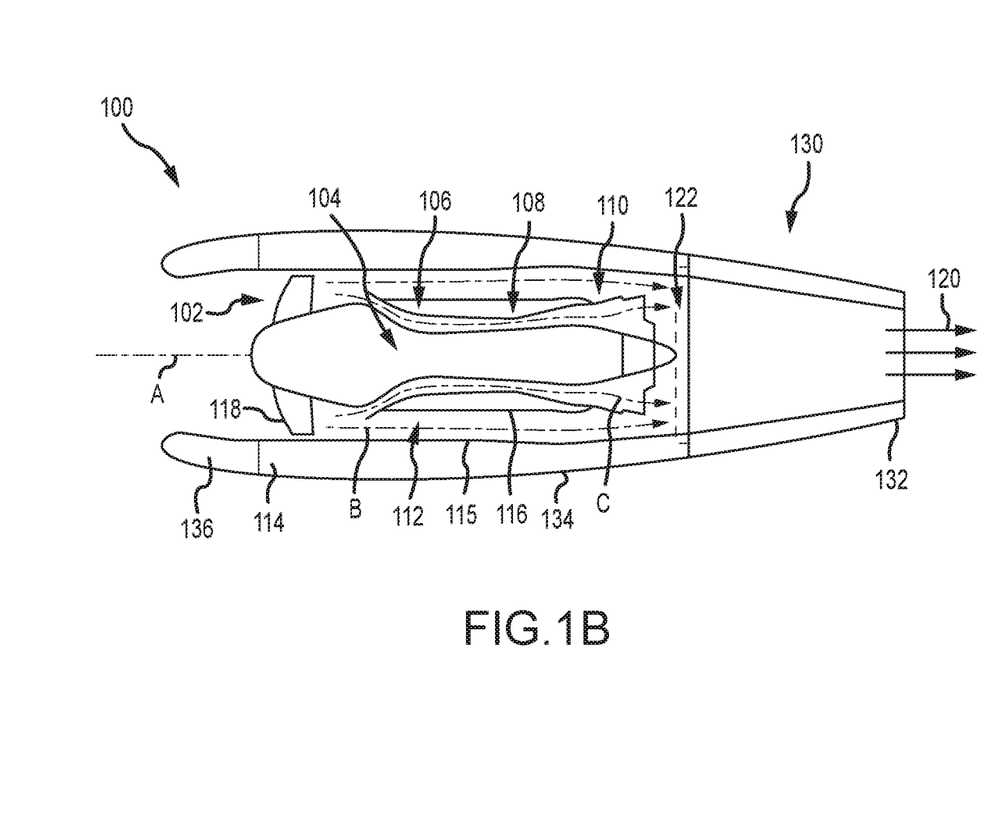
FIG. 1B illustrates a schematic view of a nacelle surrounding a gas turbine engine, in accordance with various embodiments.

With continued reference to the drawings, FIG. 1B schematically illustrates a gas turbine engine 100 of the turbofan variety, similar to the gas turbine engine 16 described above with reference to FIG. 1A. The gas turbine engine 100 generally includes a fan section 102 and a core engine section 104, which includes a compressor section 106, a combustor section 108 and a turbine section 110. The fan section 102 drives air along a bypass flow path B in a bypass duct 112 defined within a radially inner surface 115 of a nacelle 114 and an outer casing 116 of the core engine section 104, while the compressor section 106 drives air along a core flow path C of the core engine section 104 for compression and communication into the combustor section 108 and then expansion through the turbine section 110.

The core engine section 104 may generally include a low speed spool and a high speed spool mounted for rotation about a central longitudinal axis A. The low speed spool generally includes an inner shaft that interconnects a fan 118 within the fan section 102, a low pressure compressor within the compressor section 106 and a low pressure turbine within the turbine section 110. The inner shaft may be connected to the fan 118 through a speed change mechanism or gear box to drive the fan 118 at a lower rotational speed than the rotational speed of the low speed spool. The high speed spool generally includes an outer shaft that interconnects a high pressure compressor within the compressor section 106 and a high pressure turbine within the turbine section 110. A combustor is arranged in the combustor section 108 between the high pressure compressor and the high pressure turbine. The air passing through the bypass flow path B mixes with the combustion gases exiting the core flow path C in a mixing section 122 positioned downstream of the core engine section 104 prior to discharge as a mixed exhaust stream 120, which provides the thrust achieved by the gas turbine engine 100.

In various embodiments, a thrust reverser 130 is mounted to the aft end of the gas turbine engine 100. The thrust reverser 130 includes a generally annular exhaust duct 132, which defines an outer boundary for discharging the mixed exhaust stream 120 when the thrust reverser 130 assumes a closed, stowed or retracted position, as illustrated in FIG. 1B. In various embodiments, the nacelle 114 includes a fan cowl assembly 134 that surrounds the core engine section 104. The fan cowl assembly 134 is generally positioned upstream of the thrust reverser 130 and downstream of an inlet section 136. As described further below, in various embodiments, the fan cowl assembly 134 is configured for opening to provide access to the core engine section 104 and to other components of the gas turbine engine 100. In various embodiments, the fan cowl assembly 134, the thrust reverser 130 and the inlet section 136, are similar to the fan cowl assembly 34, the thrust reverser 30 and the inlet section 36, respectively, described above with reference to FIG. 1A.

Figure 2A:
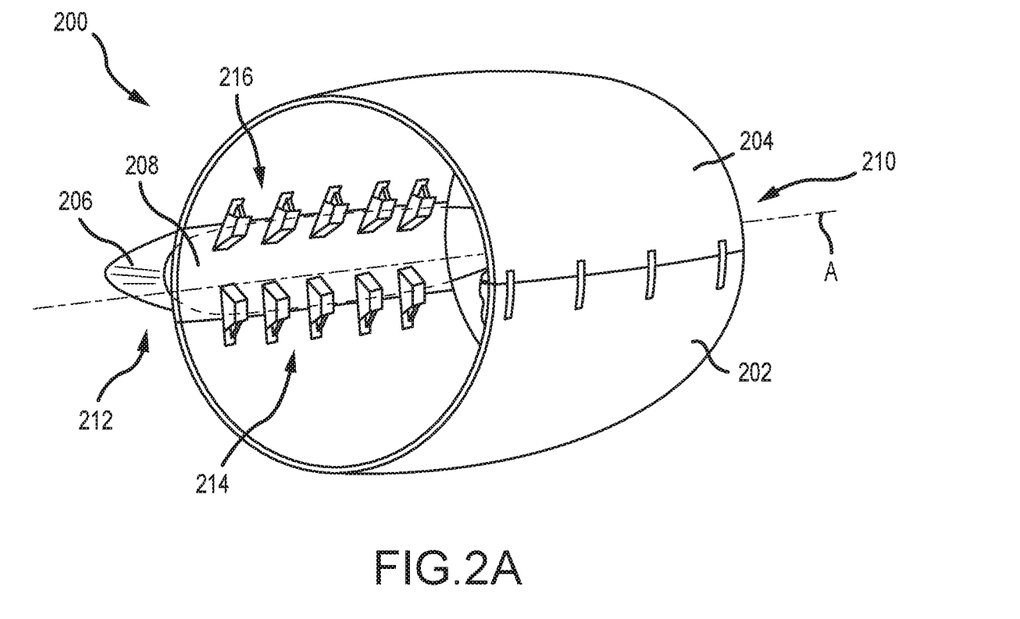
FIG. 2A illustrates a perspective view of an upper fan cowl and a lower fan cowl in a closed position, in accordance with various embodiments.
Figure 2B:
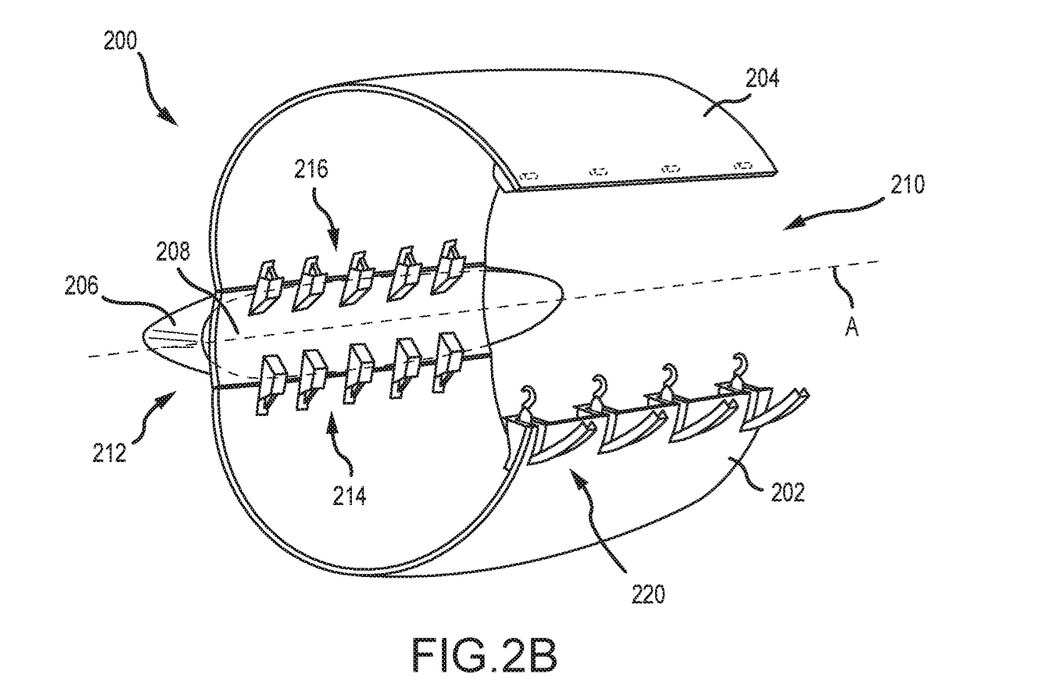
FIG. 2B illustrates a perspective view of an upper fan cowl and a lower fan cowl in an open position, in accordance with various embodiments.

With combined reference to FIGS. 2A and 2B, a fan cowl assembly 200 for a gas turbine engine, such as, for example, the fan cowl assembly 134 described above with reference to FIG. 1B, is illustrated according to various embodiments. The fan cowl assembly 200 may include a lower fan cowl 202 (or a first fan cowl) and an upper fan cowl 204 (or a second fan cowl). In various embodiments, the fan cowl assembly 200 may at least partially enclose a gas turbine engine, such as, for example, the gas turbine engine 100 described above with reference to FIG. 1B. The fan cowl assembly 200 may extend along a central longitudinal axis A. In various embodiments, the central longitudinal axis A may be co-axial with the central longitudinal axis A described above with reference to FIG. 1B. The fan cowl assembly 200 may also be coupled to a pylon 206, configured to mount the gas turbine engine to a fuselage of an aircraft, such as, for example, the fuselage 12, described above with reference to FIG. 1A.

In various embodiments, the lower fan cowl 202 and the upper fan cowl 204 may each define an outboard side 210 of the fan cowl assembly 200 that is configured to provide an opening for access to the engine. In various embodiments, the lower fan cowl 202 and the upper fan cowl 204 may each define an inboard side 212 that is configured for connecting to or proximate the pylon 206. In various embodiments, a lower hinge assembly 214 (or a first hinge assembly) is used to connect the lower fan cowl 202 to an inboard fan cowl section 208 that is itself connected to the pylon 206. In various embodiments, an upper hinge assembly 216 (or a second hinge assembly) is used to connect the upper fan cowl 204 to the inboard fan cowl section 208. The upper hinge assembly 216 and the lower hinge assembly 214 are configured to permit the upper fan cowl 204 and the lower fan cowl 202, respectively, to pivot from a closed configuration, as illustrated in FIG. 2A, to an open configuration, as illustrated in FIG. 2B.

While the fan cowl assembly 200 described above and illustrated in FIGS. 2A and 2B extends laterally outward from the pylon 206, which is itself coupled to an aircraft fuselage, the disclosure contemplates other orientations, such as, for example, orientations where the fan cowl assembly 200 is connected to a pylon situated under a wing of an aircraft (e.g., a wing-mounted fan cowl assembly). In such orientations, for example, the upper and lower fan cowls, described above, may be described, in various embodiments, as left and right fan cowls (or first and second fan cowls) or, similarly, as inboard and outboard fan cowls. In addition, while the upper and lower fan cowls or the left and right fan cowls (or, more generally, the first and second fan cowls) are illustrated or otherwise described as being coupled to a pylon via hinge assemblies, the disclosure contemplates various embodiments where only one of a first fan cowl or a second fan cowl is connected to the pylon via a hinge assembly, with the other of the two fan cowls being connected to the pylon using one or more pins or other connections such that the other of the two fan cowls is not configured to articulate with respect to the pylon.

Figure 3:
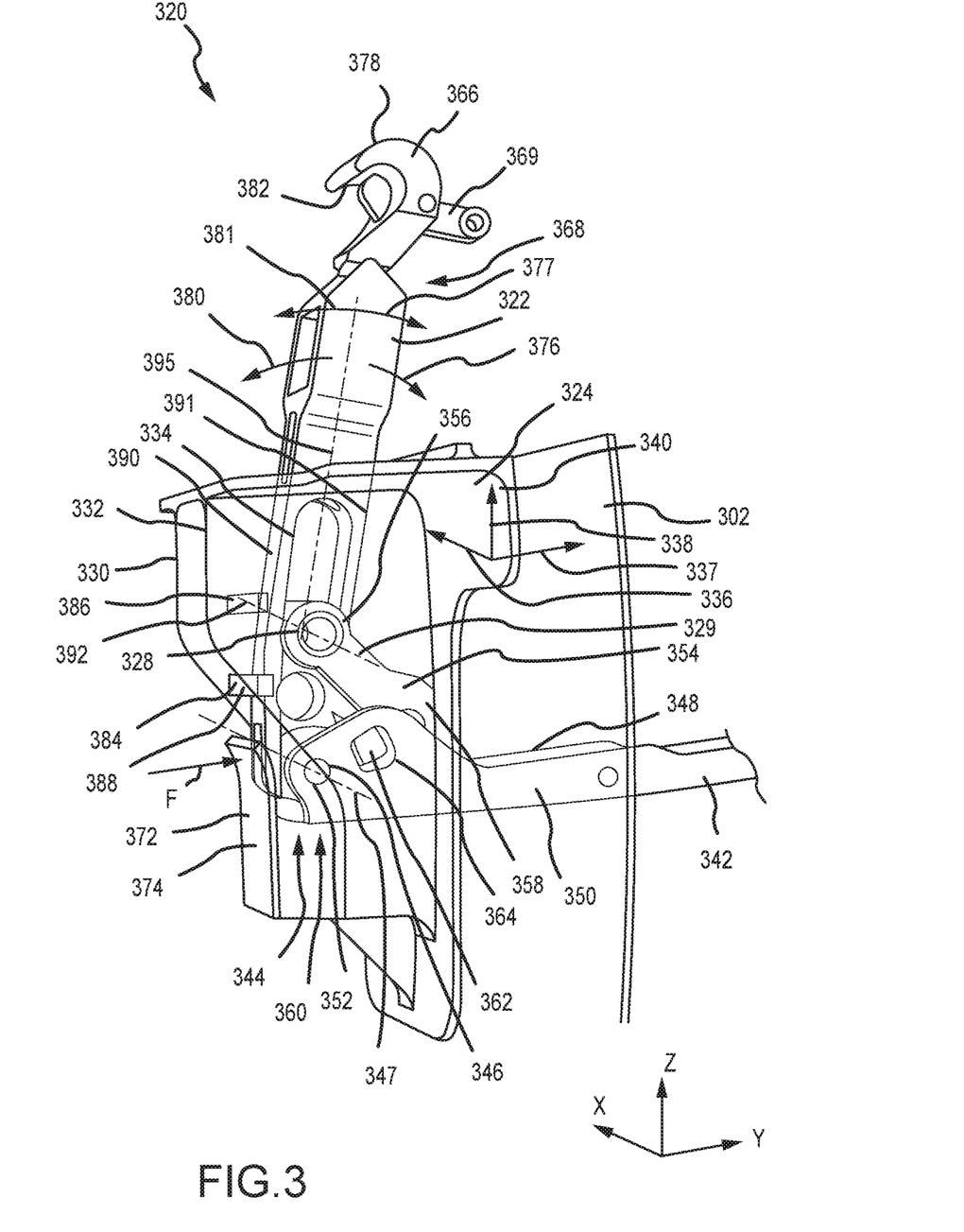
FIG. 3 illustrates a latch mechanism, in accordance with various embodiments.

Referring to FIG. 3, a latch mechanism 320 is illustrated, in accordance with various embodiments. The latch mechanism 320 includes a latch arm 322 pivotally mounted to a latch frame 324, which is itself mounted to a first fan cowl 302 (e.g., one of a lower fan cowl or an upper fan cowl). In various embodiments, the latch arm 322 is mounted to the latch frame 324 by a first spindle 328 secured to a first frame wall 330 and to a second frame wall 332 of the latch frame 324. The latch arm 322 may include an elongate slot 334, through which the first spindle 328 extends, that enables the latch arm 322 to both rotate about an axial direction 336 that is generally parallel to the first spindle 328, or about a first spindle axis 329 (or a first pivot axis) extending through the first spindle 328, and translate in a longitudinal direction 338 that is generally parallel to a back plate 340 of the latch frame 324. In various embodiments, the first frame wall 330 and the second frame wall 332 are mounted to the back plate 340, such that both the first frame wall 330 and the second frame wall 332 extend in a generally perpendicular direction from the back plate 340 and away from the first fan cowl 302.

For clarity, the axial direction 336 and the longitudinal direction 338 are generally referred to with respect to the latch frame 324, which may assume a continuously changing orientation with respect to a fixed XYZ coordinate system as the first fan cowl 302 is opened and closed, with the axial direction 336 being generally parallel with respect to the X direction of the XYZ coordinate system and the longitudinal direction 338 being generally confined to the YZ plane of the XYZ coordinate system as the first fan cowl 302 is opened and closed. A transverse direction 337, generally perpendicular to a plane defined by the axial direction 336 and the longitudinal direction 338, completes a local coordinate system with respect to the latch frame 324.

The latch mechanism 320 may further include a latch handle 342 that is pivotally mounted to a proximal end 344 of the latch arm 322 via a second spindle 346. In various embodiments, the latch handle 342 includes a first handle wall 348 and a second handle wall 350 to which the second spindle 346 is secured and the latch arm 322 includes a proximal end aperture 352 through which the second spindle 346 extends, typically parallel to the axial direction 336. The latch handle 342 is configured to pivot with respect to the second spindle 346, or about a second spindle axis 347 extending through the second spindle 346. In various embodiments, the latch mechanism 320 further includes a connecting arm 354 having a first end 356 pivotally connected to the first spindle 328 and a second end 358 pivotally connected to a proximal end 360 of the latch handle 342. In various embodiments, the pivotal connection between the second end 358 of the connecting arm 354 and the proximal end 360 of the latch handle 342 may be accomplished via a first stud (hidden) extending through a first aperture (hidden) in the first handle wall 348 and a second stud 362 extending through a second aperture 364 in the second handle wall 350. A latch arm hook 366 may be disposed at a distal end 368 of the latch arm 322 and configured to engage a mating pin (e.g., the mating pin 470 shown in FIG. 4D) disposed within a second fan cowl (e.g., the second fan cowl 404 shown in FIG. 4D) to which the first fan cowl 302 is releasably locked. In various embodiments, a latch lock 369 is disposed on the latch arm hook 366 and configured to lock the latch arm hook 366 to the mating pin of the second fan cowl.

The latch mechanism 320 includes a bias member 372 disposed proximate the proximal end 344 of the latch arm 322 and configured to provide a load F, generally in the transverse direction 337, against the proximal end 344 of the latch arm 322. In various embodiments, the bias member 372 may comprise a spring plate 374 mounted to the latch frame 324 (e.g., to the first frame wall 330 and to the second frame wall 332). The bias member 372 is configured to bias the proximal end 344 of the latch arm 322 in a direction toward the back plate 340, such that the latch arm 322 is biased from rotating in a first rotational direction 376 in order to maintain a generally upright position in the longitudinal direction 338. Stated otherwise, the load F provides a torque about the first spindle axis 329 that biases the distal end 368 of the latch arm 322 from rotating toward the back plate 340 of the latch frame 324.

During operation (e.g., when closing the first fan cowl 302 against the second fan cowl), the bias member 372 will enable the latch arm 322 to rotate slightly in the first rotational direction 376 about the first spindle 328 upon an outer surface 378 of the latch arm hook 366 making contact with the mating pin (e.g., the mating pin 470 shown in FIG. 4D), thus allowing the outer surface 378 of the latch arm hook 366 to slide about the mating pin. Once the outer surface 378 of the latch arm hook 366 has cleared the mating pin, the bias member 372 urges the latch arm 322 to rotate in a second rotational direction 380 (e.g., the reverse of the first rotational direction 376), causing an inner surface 382 of the latch arm hook 366 to engage the mating pin. In various embodiments, and as just described, the bias member 372 does not prevent rotation of the latch arm 322 in the first rotational direction 376. Rather, the bias member 372 provides a bias against rotation of the latch arm 322 in the first rotational direction 376, which bias may be overcome by an opposing force applied opposite the load F. The opposing force opposite the load F may arise, for example, from a torque applied to the latch arm 322 (about the first spindle axis 329) as the outer surface 378 of the latch arm hook 366 is forced to slide about the mating pin when closing the first fan cowl 302 against the second fan cowl.

Still referring to FIG. 3, the latch mechanism 320 may also include one or more latch arm stops, such as, for example, a first latch arm stop 384 and a second latch arm stop 386. In various embodiments, the first latch arm stop 384 comprises a first member 388 (e.g., a first rod, which may be circular or rectangular in cross section) extending between the first frame wall 330 and the second frame wall 332. In various embodiments, the first latch arm stop 384 is positioned at a first longitudinal position (with respect to the longitudinal direction 338) below the first spindle axis 329, thereby providing a first stop against an outer side 390 of the latch arm 322 when the latch arm 322 rotates about the first spindle axis 329 in the first rotational direction 376 (or following the latch arm 322 having been rotated a first rotational movement 377 about the first spindle axis 329 in the first rotational direction 376). Similarly, in various embodiments, the second latch arm stop 386 comprises a second member 392 (e.g., a second rod, which may be circular or rectangular in cross section) extending between the first frame wall 330 and the second frame wall 332. In various embodiments, the second latch arm stop 386 is positioned at a second longitudinal position (with respect to the longitudinal direction 338) above the first spindle axis 329, thereby providing a second stop against an outer side 390 of the latch arm 322 when the latch arm 322 rotates about the first spindle axis 329 in the second rotational direction 380 (or following the latch arm 322 having been rotated a second rotational movement 381 about the first spindle axis 329 in the second rotational direction 380). As illustrated in FIG. 3, the first rotational movement 377 and the second rotational movement 381 may be defined with respect to a longitudinal axis 395 extending along the latch arm 322 from the proximal end 344 to the distal end 368.

As illustrated in FIG. 3, in various embodiments, the outer side 390 of the latch arm 322 is on a side of the latch arm 322 opposite the back plate 340 and the first latch arm stop 384 and the second latch arm stop 386 are disposed at locations on the latch frame 324 such that they make contact with the outer side 390 of the latch arm 322. In various embodiments, however, the disclosure contemplates the first latch arm stop 384 and the second latch arm stop 386 being disposed at locations on the latch frame 324 such that they make contact with an inner side 391 of the latch arm 322 or, in various embodiments, one of the first latch arm stop 384 and the second latch arm stop 386 may be disposed at a location on the latch frame 324 to make contact with the outer surface 390 of the latch arm 322, while the other of the first latch arm stop 384 and the second latch arm stop 386 may be disposed at a location on the latch frame 324 to make contact with the inner surface 391 of the latch arm 322. Similarly, while the bias member 372 is illustrated as providing the load F generally in the transverse direction 337 and against the outer surface 390 of the latch arm 322 at the proximal end 344 of the latch arm 322, the disclosure contemplates the bias member 372 being disposed at other locations on the latch frame 324, such as, for example, at an upper location of the latch frame 324 (e.g., above the first spindle axis 329) where a load opposite in direction to the load F may be applied to the inner surface 391 of the latch arm 322. Additionally, while the load F is generally described as a compressive load, the disclosure contemplates bias members configured to provide tensile loads against the latch arm 322 at various locations along the latch arm 322. Consistent with the foregoing, the disclosure contemplates use of bias members other than the spring plate 374 configured to provide the load against the latch arm 322. For example, in various embodiments, the bias member 372 may comprise one or more of a coil spring configured to apply either compressive or tensile loads to the latch arm 322, a torsional spring configured to provide a torque to the latch arm 322 or a flexible block of material, such as, for example, a block of silicone, configured to bias the latch arm 322 using a compressive or tensile load. The disclosure, accordingly, considers the bias member 372 as being construed broadly and not limited to the spring plate 374.

Referring now to FIGS. 4A-4F, various steps employed in closing and locking a fan cowl assembly 400, such as, for example, the fan cowl assembly 200 described above with reference to FIGS. 2A and 2B, are described. In various embodiments, the fan cowl assembly 400 includes a first fan cowl 402 and a second fan cowl 404, connected by a first hinge assembly 414 and a second hinge assembly 416, respectively, to an inboard fan cowl section 408 that is itself connected to a pylon, such as, for example, the pylon 206 described above with reference to FIGS. 2A and 2B. The first fan cowl 402 includes a latch mechanism 420 (or a plurality of latch mechanisms), such as, for example, the latch mechanism 320 described above with reference to FIG. 3. In various embodiments, the latch mechanism 420 includes a latch arm 422 and a latch arm hook 466 connected to a distal end 468 of the latch arm 422 and a bias member 472 operably coupled to a proximal end 444 of the latch arm 422. In various embodiments, the structural and operational characteristics of the latch mechanism 420 are the same as the latch mechanism 320 described above with reference to FIG. 3 and, therefore, are not repeated here. In various embodiments, the second fan cowl 404 includes a mating pin 470 (or a plurality of mating pins) configured to be engaged by the latch arm hook 466.

Figure 4A:
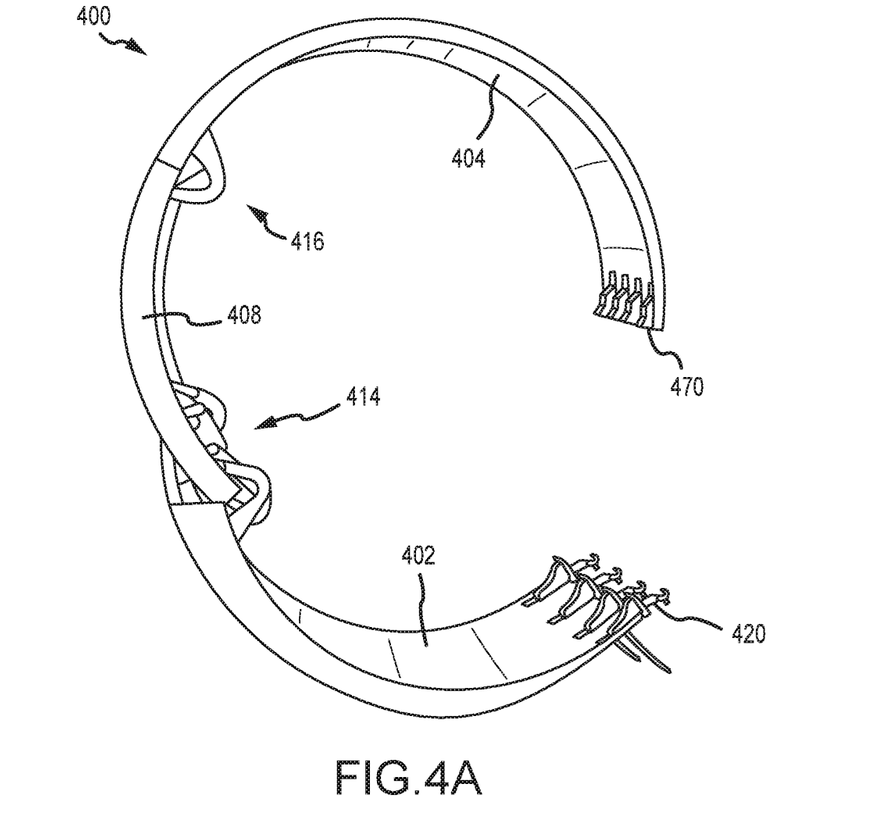
FIGS. 4A and 4B illustrate a fan cowl assembly and a latch mechanism in an open position, in accordance with various embodiments.
Figure 4B:
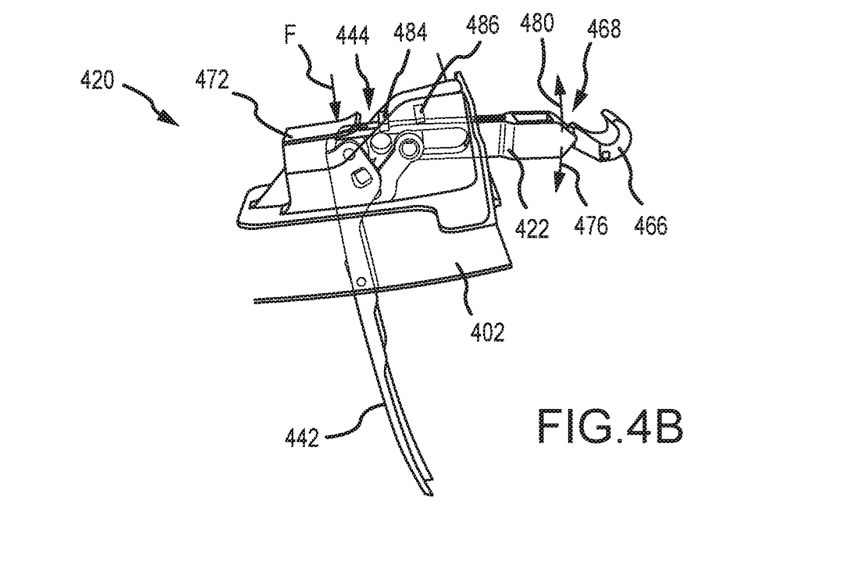
Figure 4C:
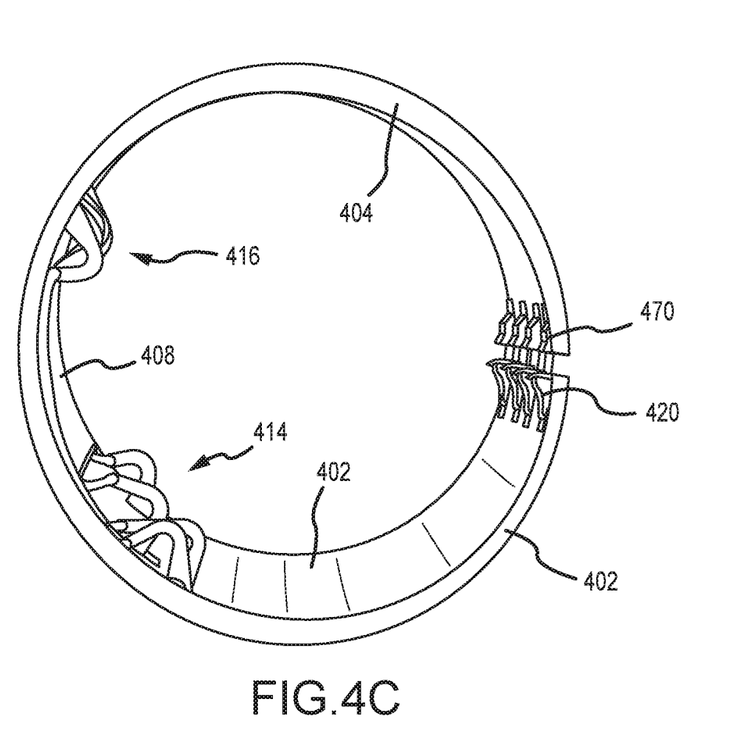
FIGS. 4C and 4D illustrate a fan cowl assembly and a latch mechanism in a near-closed position, in accordance with various embodiments.
Figure 4D:
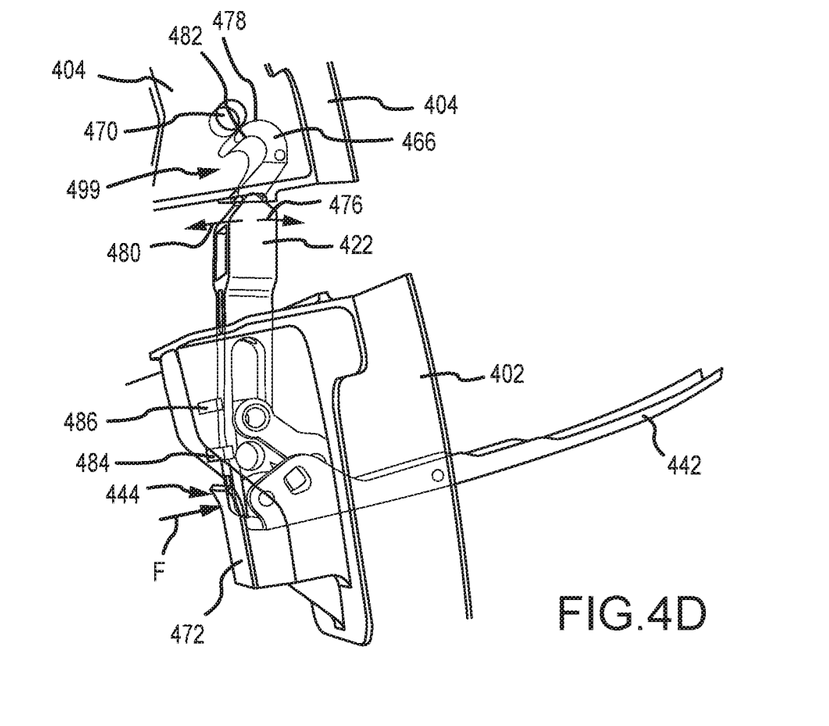
Figure 4E:
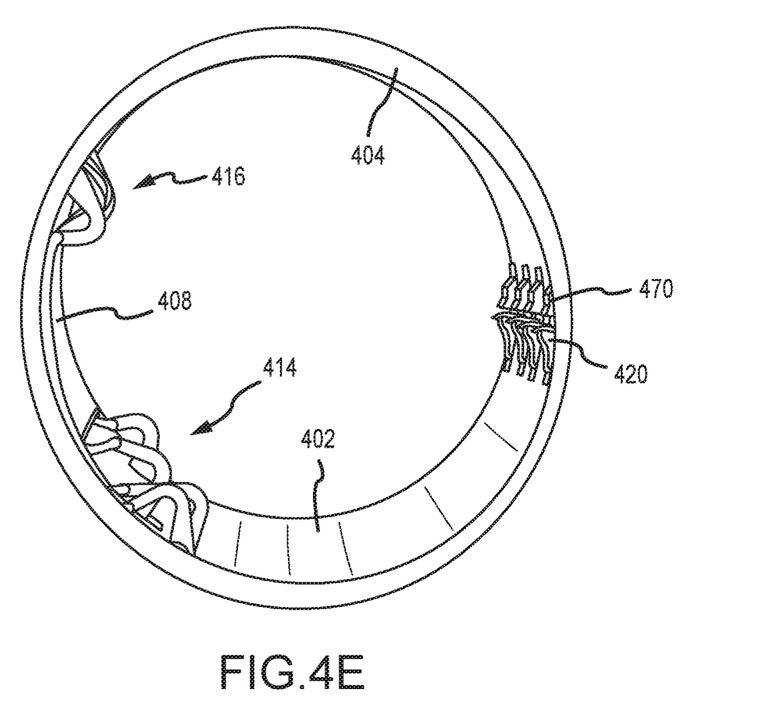
FIGS. 4E and 4F illustrate a fan cowl assembly and a latch mechanism in a closed position, in accordance with various embodiments.
Figure 4F:
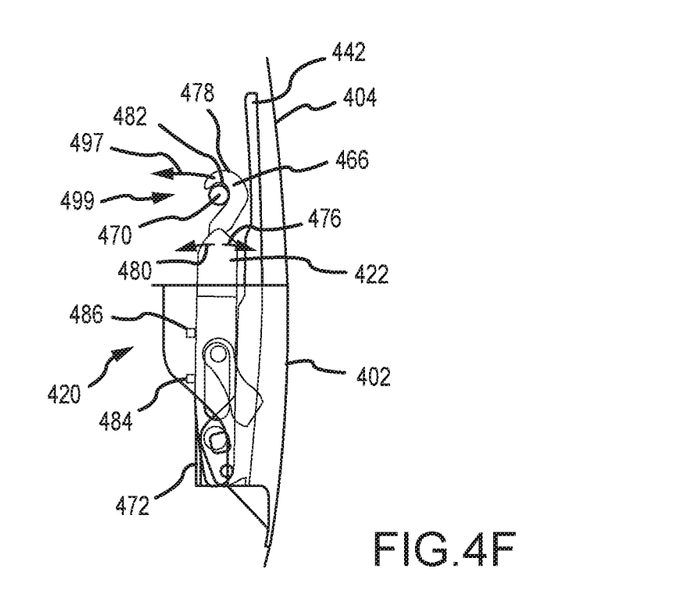

Referring specifically to FIGS. 4A and 4B, the second fan cowl 404 is illustrated in a closed position, having been rotated to the closed position via the second hinge assembly 416. The first fan cowl 402 is illustrated in an open position, prepared for rotation to the closed position via the first hinge assembly 414. The latch mechanism 420 is illustrated in FIG. 4B in a pre-loaded state, whereby the bias member 472 is providing a load F against the proximal end 444 of the latch arm 422. Referring now to FIGS. 4C and 4D, the first fan cowl 402 is illustrated having been rotated about the first hinge assembly 414 to a point where an outer surface 478 of the latch arm hook 466 makes contact with the mating pin 470. Further rotation of the first fan cowl 402 toward the second fan cowl 404 (or toward the closed position), causes the outer surface 478 of the latch arm hook 466 to slide about the mating pin 470 to a point where an opening 499, defined by an inner surface 482 of the latch arm hook 466, is urged by the bias member 472 to move in a transverse direction 497 with respect to an axial direction extending through the mating pin 470 and to engage the mating pin 470, as illustrated in FIGS. 4E and 4F. A latch handle 442 may then be rotated to a closed position, as illustrated in FIG. 4F, to lock the first fan cowl 402 to the second fan cowl 404. Similar to the construction and operation of the latch mechanism 320 described above with reference to FIG. 3, in various embodiments, the latch mechanism 420 includes a first latch arm stop 484 configured to stop the latch arm from rotating in a first rotational direction 476 following a first rotational movement in the first rotational direction 476 and a second latch arm stop 486 configured to stop the latch arm from rotating in a second rotational direction 480 following a second rotational movement in the second rotational direction 480.

Figure 5:
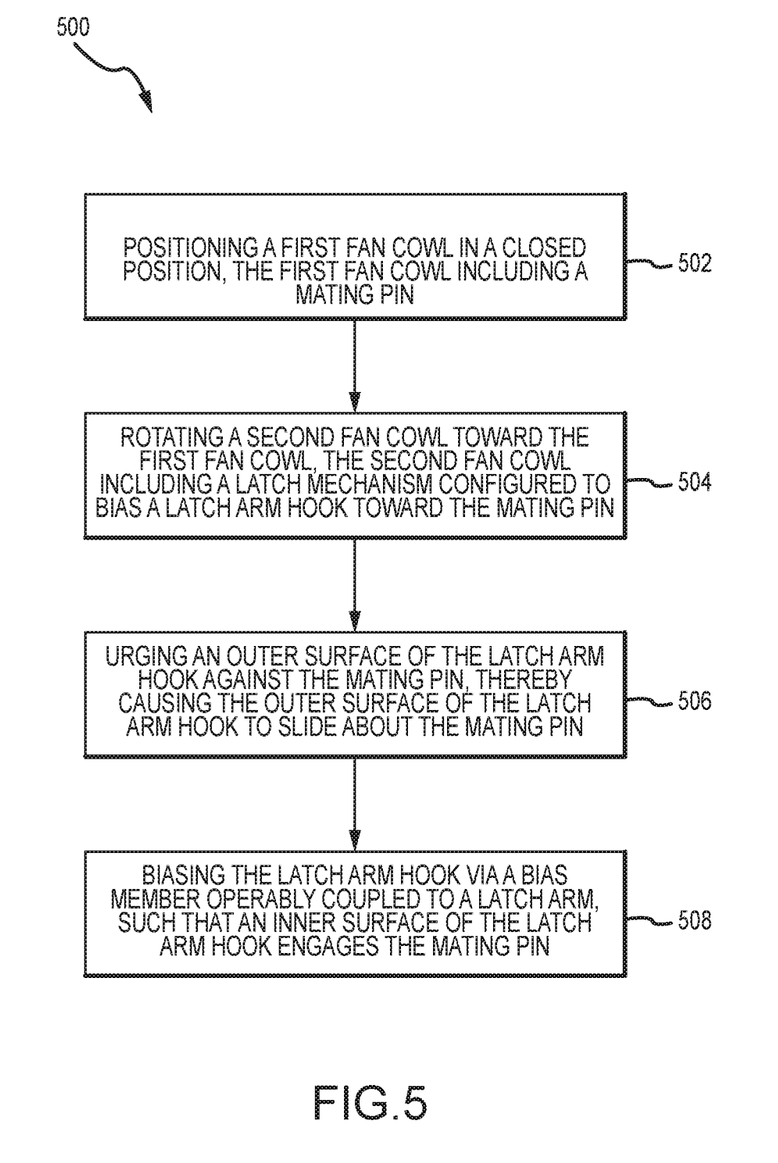
FIG. 5 describes a method of locking a fan cowl assembly, in accordance with various embodiments.

Referring now to FIG. 5, a method 500 of locking a fan cowl assembly is described, in accordance with various embodiments. In a first step 502, a first fan cowl (or a second fan cowl) is rotated to a closed position, the first fan cowl including a mating pin defining an axial direction. In a second step 504, a second fan cowl (or a first fan cowl) is rotated toward the first fan cowl, the second fan cowl including a latch mechanism configured to bias a latch arm hook in a transverse direction, generally perpendicular to the axial direction, toward the mating pin, the latch arm hook connected to a distal end of a latch arm. In a third step 506, an outer surface of the latch arm hook is urged against the mating pin, thereby causing the outer surface of the latch arm hook to slide about the mating pin and expose an opening of the latch arm hook configured to engage the mating pin. In a fourth step 508, the latch arm hook, which is biased via a bias member operably coupled to the latch arm, is translated by the bias member in a transverse direction with respect to the axial direction, such that the opening of the latch arm hook, defined by an inner surface of the latch arm hook, engages the mating pin, thereby locking the first fan cowl to the second fan cowl.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

In various embodiments, system program instructions or controller instructions may be loaded onto a tangible, non-transitory, computer-readable medium (also referred to herein as a tangible, non-transitory, memory) having instructions stored thereon that, in response to execution by a controller, cause the controller to perform various operations. The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media that were found by In Re Nuijten to fall outside the scope of patentable subject matter under 35 U.S.C. § 101.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, any of the above described concepts can be used alone or in combination with any or all of the other above described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed is:

1. A latch mechanism configured to engage a mating pin, comprising:
a latch frame;
a latch arm pivotally mounted to the latch frame at a pivot axis, wherein the latch frame defines a longitudinal direction generally perpendicular to the pivot axis and a first latch arm stop and a second latch arm stop are disposed on opposite sides of the pivot axis along the longitudinal direction,
wherein the first latch arm stop is connected to the latch frame and configured to stop the latch arm from rotating in a first rotational direction following a first rotational movement in the first rotational direction, and
wherein the second latch arm stop is connected to the latch frame and configured to stop the latch arm from rotating in a second rotational direction following a second rotational movement in the second rotational direction; and
a bias member configured to apply a load to the latch arm in a transverse direction generally perpendicular to the pivot axis and to bias the latch arm from rotating in the first rotational direction about the pivot axis and from rotating away from the mating pin,
wherein the latch frame includes a first frame wall and a second frame wall connected to a back plate,
wherein the latch arm is pivotally mounted to the first frame wall and to the second frame wall via a first spindle, and
wherein the bias member includes a spring plate configured to provide the load to a proximal end of the latch arm.

2. The latch mechanism of claim 1, wherein the first latch arm stop is disposed at a first longitudinal position with respect to the pivot axis.

3. The latch mechanism of claim 1, wherein the second latch arm stop is disposed at a second longitudinal position with respect to the pivot axis.

4. The latch mechanism of claim 1, wherein the bias member is configured to provide the load at a proximal end of the latch arm.

5. The latch mechanism of claim 4, wherein the pivot axis is located intermediate the proximal end and a distal end of the latch arm.

6. The latch mechanism of claim 1, wherein a first latch arm stop is connected to the latch frame and configured to stop the latch arm from rotating in the first rotational direction following a first rotational movement in the first rotational direction and a second latch arm stop is connected to the latch frame and configured to stop the latch arm from rotating in a second rotational direction following a second rotational movement in the second rotational direction.

7. The latch mechanism of claim 6, further comprising a latch handle coupled to the proximal end of the latch arm via a second spindle.

8. The latch mechanism of claim 7, further comprising a latch arm hook disposed at a distal end of the latch arm and configured to engage the mating pin.

9. A fan cowl assembly, comprising:
a first fan cowl connected to an inboard fan cowl section via a first hinge assembly;
a second fan cowl connected to the inboard fan cowl section;
a latch mechanism configured to lock the first fan cowl to the second fan cowl, the latch mechanism comprising
a latch frame,
a latch arm pivotally mounted to the latch frame at a pivot axis, and
a bias member configured to apply a load to the latch arm in a transverse direction generally perpendicular to the pivot axis and to bias the latch arm from rotating in a first rotational direction about the pivot axis;
a first latch arm stop connected to the latch frame and configured to stop the latch arm from rotating in the first rotational direction following a first rotational movement in the first rotational direction, the first latch arm stop disposed at a first longitudinal position with respect to the pivot axis; and
a second latch arm stop connected to the latch frame and configured to stop the latch arm from rotating in a second rotational direction following a second rotational movement in the second rotational direction, the second latch arm stop disposed at a second longitudinal position with respect to the pivot axis, wherein the first latch arm stop and the second latch arm stop are disposed on opposite sides of the pivot axis along the longitudinal direction.

10. The fan cowl assembly of claim 9, wherein the latch frame defines a longitudinal direction generally perpendicular to the pivot axis, and the bias member includes a spring plate configured to provide the load to a proximal end of the latch arm.

11. A method of locking a fan cowl assembly, comprising:
positioning a first fan cowl in a closed position, the first fan cowl including a mating pin defining an axial direction;
rotating a second fan cowl toward the first fan cowl, the second fan cowl including a latch mechanism configured to bias a latch arm hook in a transverse direction, generally perpendicular to the axial direction, toward the mating pin, the latch arm hook connected to a distal end of a latch arm;
urging an outer surface of the latch arm hook against the mating pin, thereby causing the outer surface of the latch arm hook to slide about the mating pin as the second fan cowl is rotated toward the first fan cowl; and
biasing the latch arm hook via a bias member operably coupled to the latch arm, such that an inner surface of the latch arm hook engages the mating pin,
wherein the latch mechanism includes a latch frame, the latch arm pivotally mounted to the latch frame at a pivot axis, wherein the latch frame defines a longitudinal direction generally perpendicular to the pivot axis and a first latch arm stop and a second latch arm stop are disposed on opposite sides of the pivot axis along the longitudinal direction, the bias member configured to apply a load to a proximal end of the latch arm, the first latch arm stop connected to the latch frame and configured to stop the latch arm from rotating in a first rotational direction following a first rotational movement in the first rotational direction and the second latch arm stop connected to the latch frame and configured to stop the latch arm from rotating in a second rotational direction following a second rotational movement in the second rotational direction, wherein the latch frame includes a first frame wall and a second frame wall connected to a back plate, wherein the latch arm is pivotally mounted to the first frame wall and to the second frame wall via a spindle and wherein the bias member includes a spring plate configured to provide the load to a proximal end of the latch arm.

* * * * *